(12) United States Patent
Prat et al.

(10) Patent No.: US 10,874,047 B1
(45) Date of Patent: Dec. 29, 2020

(54) STRING CUTTER WITH SUPPORT

(71) Applicants: Roderic Leonard Prat, Shawnigan Lake (CA); Christopher J. Fielding, Carlisle, MA (US)

(72) Inventors: Roderic Leonard Prat, Shawnigan Lake (CA); Christopher J. Fielding, Carlisle, MA (US)

( * ) Notice: Subject to any disclaimer, the term of this patent is extended or adjusted under 35 U.S.C. 154(b) by 0 days.

(21) Appl. No.: 15/841,654

(22) Filed: Dec. 14, 2017

(51) Int. Cl.
| | |
|---|---|
| A01D 34/416 | (2006.01) |
| A01D 34/67 | (2006.01) |
| A01D 34/68 | (2006.01) |
| A01D 34/74 | (2006.01) |
| A01D 34/76 | (2006.01) |
| A01D 34/78 | (2006.01) |
| A01G 3/06 | (2006.01) |

(52) U.S. Cl.
CPC ......... *A01D 34/4165* (2013.01); *A01D 34/67* (2013.01); *A01D 34/68* (2013.01); *A01D 34/74* (2013.01); *A01D 34/76* (2013.01); *A01D 34/78* (2013.01); *A01G 3/062* (2013.01)

(58) Field of Classification Search
CPC .... A01D 34/4165; A01D 34/67; A01D 34/68; A01D 34/74; A01D 34/76; A01D 34/78; A01G 3/062
USPC ...................... 56/12.7, 16.7, 17.1, 17.2, 17.3
See application file for complete search history.

(56) References Cited

U.S. PATENT DOCUMENTS

| | | | | |
|---|---|---|---|---|
| 1,992,494 | A | * | 2/1935 | Lundin .................. A01D 34/78 56/17.2 |
| 2,643,502 | A | * | 6/1953 | Flanigan ................ A01D 34/78 56/17.1 |
| 2,708,335 | A | | 5/1955 | Newton |
| 2,770,085 | A | * | 11/1956 | Laughlin ................ A01D 34/63 56/17.5 |
| 3,141,283 | A | * | 7/1964 | Swindler ................ A01D 34/63 56/17.2 |
| 3,150,720 | A | * | 9/1964 | Hartnett ................. A01D 34/84 172/16 |
| 3,548,571 | A | * | 12/1970 | Snook .................... A01D 34/63 56/17.5 |
| 4,024,695 | A | * | 5/1977 | Haseloff .............. A01D 34/685 180/19.2 |
| 4,077,191 | A | * | 3/1978 | Pittinger, Sr. et al. ..................... A01D 34/416 30/276 |
| 4,182,100 | A | | 1/1980 | Letter |

(Continued)

*Primary Examiner* — Clark F Dexter
(74) *Attorney, Agent, or Firm* — Gary Walpert

(57) ABSTRACT

A string motor/cutter mechanism has a hollow shaft motor having an internal shaft extending therethrough, open at at least one end, and the shaft being aligned with a motor rotation axis; a string cutting mechanism axially aligned to the motor axis and connected to the motor in a rotational connection enables the motor to rotate the string cutting mechanism at a cutting rotational speed. A rotary support mechanism has a mounting shaft for rotatably connecting a single axis, axially rotating, rolling mechanism in supporting engagement to the motor, the mounting shaft extending within and aligned with the axis of the hollow shaft of the motor. The rotary mechanism mounting shaft is connected in an operationally fixed position along the hollow motor shaft to support the cutting mechanism a selected distance, measured along the mounting shaft axis, from a ground surface on which the rolling mechanism travels.

8 Claims, 9 Drawing Sheets

(56) References Cited

U.S. PATENT DOCUMENTS

| | | | |
|---|---|---|---|
| 4,285,128 A * | 8/1981 | Schnell et al. | A01D 34/4161 |
| | | | 30/276 |
| 4,873,819 A | 10/1989 | Shivers et al. | |
| 5,070,685 A | 12/1991 | Gait | |
| 5,317,807 A | 6/1994 | Pulley | |
| 5,408,816 A | 4/1995 | Cartier | |
| 5,459,985 A | 10/1995 | Gedert | |
| 5,467,584 A | 11/1995 | Boyles | |
| 5,829,236 A | 11/1998 | Ballard et al. | |
| 5,970,694 A | 10/1999 | Knox | |
| 7,222,476 B2 | 5/2007 | Hishida | |
| 7,557,476 B2 | 7/2009 | Brock | |
| 7,617,661 B2 | 11/2009 | Faeldan | |
| 7,823,370 B1 | 11/2010 | Wiebe et al. | |
| 8,025,249 B2 * | 9/2011 | Alliss et al. | A01D 34/4165 |
| | | | 242/388.1 |
| 8,176,989 B1 | 5/2012 | Ponomarenko | |
| 8,769,918 B2 * | 7/2014 | Williams | A01D 34/84 |
| | | | 56/17.5 |
| 2002/0166239 A1 * | 11/2002 | Weissert et al. | A01D 34/90 |
| | | | 30/276 |
| 2009/0025351 A1 | 1/2009 | Faeldan | |

* cited by examiner

# STRING CUTTER WITH SUPPORT

BACKGROUND OF THE INVENTION

The invention relates generally to string cutter devices, and more particularly to a structure for supporting a string cutter in a stable, spaced relationship from the surface over which the cutter moves.

String cutters are well-known devices used, for example, for edging and cutting weeds, grass, and other vegetation in a quick and efficient manner. A string cutter is also referred to as a line trimming device, "line trimmers,", and "weedwackers", etc. These string cutters utilize a rapidly rotating monofilament line. They can be and are used widely both privately and commercially for lawn care.

Generally, these devices employ a rapidly rotating monofilament line to cut and remove vegetation or debris. The string cutter uses the whipping or cutting action of the rapidly rotating line. The line strikes the vegetation or debris, first severing it at or near the point of impact, and then clears the cuttings from their original position with the rotation or whipping action of the line. Commonly known commercial embodiments of often called line trimmers or "weedeater."

In most commercial embodiments of string cutters, the monofilament line is deployed from within a storage compartment or hub in which the line is spooled. The hub serves as a mechanism for rotating an extension of the line that protrudes from the hub outer circumference. In most cases, the hub is rotated by either an electric or gasoline powered motor. An operator using the string cutter controls the cutting path using a shaft attached to the motor and having spaced handle grips at an upper end of the shaft.

Also, in typical commercial embodiments of the string cutter, the cutting head is located at a distal end of the shaft away from the handle grips. In operation, the cutting head is held and manipulated above, but proximate to, the ground at a safe distance from the user's body. As a result of the cantilevered weight of the string cutter, the user may suffer fatigue and muscle strain in a relatively short time. In addition, especially in gasoline powered cutters, the motor vibration also contributes to fatigue and muscle strain.

A further concern associated with the unwanted movement of the string cutter is the difficulty in obtaining a uniform cut. As users spend a great deal of time and money caring for their lawns, the string cutters have become one of the most important pieces of lawn care equipment because of their versatility and ability to reach places that traditional lawnmowers cannot reach. However, when used for a period of time, due to the vibration, balance, and the weight of the string cutters, most people have difficulty maintaining a constant cutting height and uniform cutting path, thus resulting in an unevenly cut lawn. Thus, there is a need for a device to support the string cutter to minimize fatigue and muscle strain while promoting a more uniform cut and providing support for freedom of movement in all directions.

SUMMARY OF THE DISCLOSURE

A string motor/cutter mechanism has a hollow shaft motor having an internal shaft extending therethrough, open at at least one end, and the shaft being aligned with a motor rotation axis; a string cutting mechanism axially aligned to the motor axis and connected to the motor in a rotational connection for enabling the motor to rotate the string cutting mechanism at a cutting rotational speed; and a rotary support mechanism having a mounting shaft for rotatably connecting a rolling mechanism in supporting engagement to the motor, the mounting shaft extending within and aligned with the axis of the hollow shaft of the motor, the rotary mechanism mounting shaft being connected in an operationally fixed position along the hollow motor shaft to support the cutting mechanism a selected distance, measured along the mounting shaft axis, from a ground surface on which the rolling mechanism travels.

In another aspect, the string motor/cutter mechanism has a motor having a motor axis and a rotational connection to a string cutting mechanism axially aligned to the motor axis for rotating the string cutting mechanism at a cutting rotational speed. The connection between the motor and the string cutting mechanism has an axial hollow structure extending from a distal end of the string cutting mechanism toward and into the motor, the hollow structure defining an internal elongated hollow shaft having an opening at at least one end of the hollow shaft structure. A rotary support mechanism has a mounting shaft for rotatably connecting a rolling mechanism in supporting engagement to the motor, the mounting shaft extending within and aligned with the axis of the hollow shaft structure of the motor, the rotary mechanism mounting shaft being connected in an operationally fixed position along the hollow shaft structure to support the cutting mechanism a selected distance, measured along the mounting shaft axis, from a ground surface on which the rolling mechanism rolls.

In yet another exemplary embodiment, the string cutter has an elongated shaft having a shaft axis with a distal end and a proximal end and a handle mechanism connected to the shaft proximate to the proximal end. A motor is connected to the shaft at the distal end, the motor having a motor axis and a rotational connection to a string cutting mechanism axially aligned to the motor axis for rotating the string cutting mechanism at a cutting rotational speed. The connection between the motor and the string cutting mechanism has an axial hollow structure extending from a distal end of the string cutting mechanism toward the connection of the motor with the elongated shaft, the hollow structure defining an internal elongated hollow shaft having an opening at at least one end of the hollow shaft structure. A rotary support mechanism has a mounting shaft for rotatably connecting a rolling mechanism in supporting engagement to the motor, the mounting shaft extending within and aligned with the axis of the hollow shaft structure of the motor, and the rotary mechanism mounting shaft being connected in an operationally fixed position along the hollow shaft structure to support the cutting mechanism a selected distance, measured along the mounting shaft axis, from a ground surface on which the rolling mechanism rolls.

DESCRIPTION OF THE DRAWINGS

Other objects and features of the invention will be apparent to one practiced in the field and are described in connection with the drawings in which.

DESCRIPTION OF THE EXEMPLARY EMBODIMENTS

Figure 1:
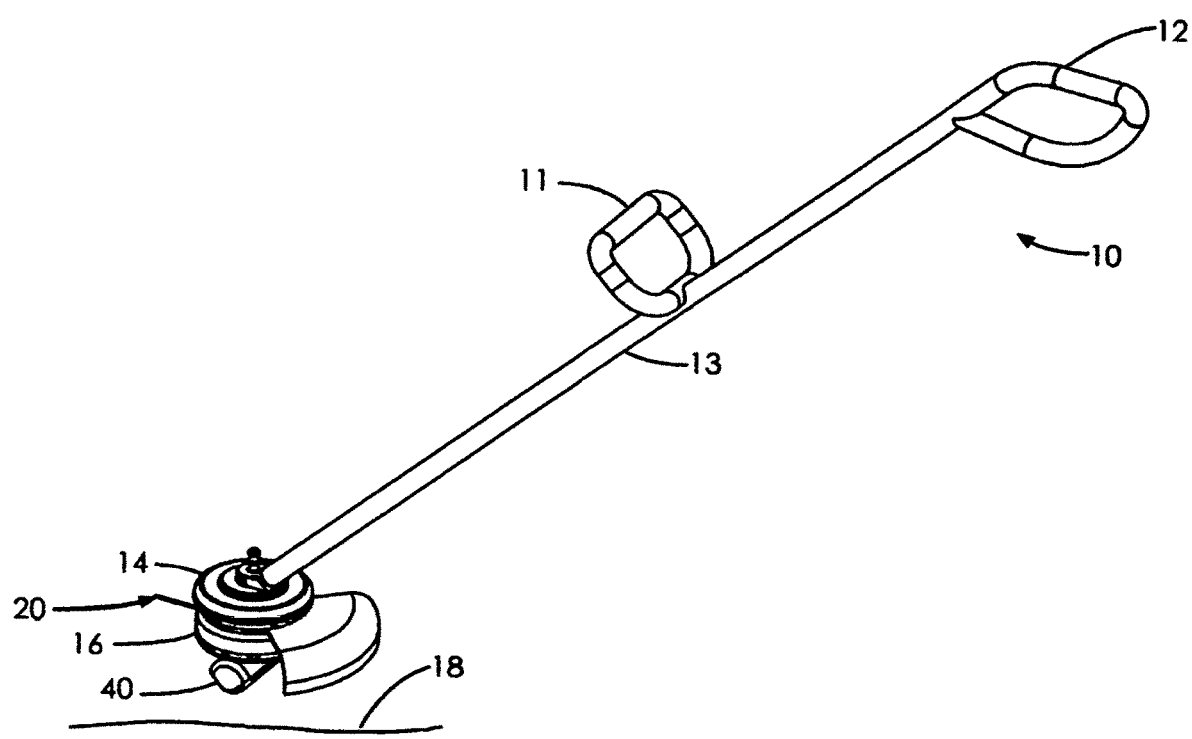
FIG. 1 is a perspective view of an exemplary string cutter in accordance with the invention.

Referring to FIG. 1, a string cutter 10, according to one exemplary embodiment of the invention, has handles 11 and 12, attached to a part of an elongated shaft 13 extending to a motor 14. The shaft is connected rigidly to the motor 14. The motor 14 connects to and drives a rotational string cutting mechanism 16. The motor 14 and string cutting mechanism 16 are supported above a surface 18 by a support mechanism 20. In general operation, the string cutter is held at the handles 11 and 12 and the motor is energized and rotates at a high speed approaching 4000 RPM. Correspondingly, string elements or filaments (FIG. 5) 21 extend radially outward from the rotational string cutting mechanism 16 and are rotated at a speed so that when the strings or filaments engage, for example weeds, grass, or other vegetation, a cutting action is effected.

Figure 3:
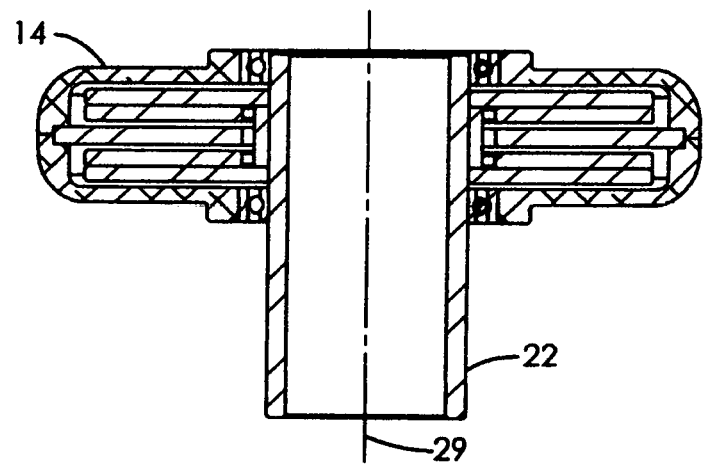
FIG. 3 is a cross section along section lines A-A of FIG. 2 according to an exemplary embodiment of the invention.
Figure 2:
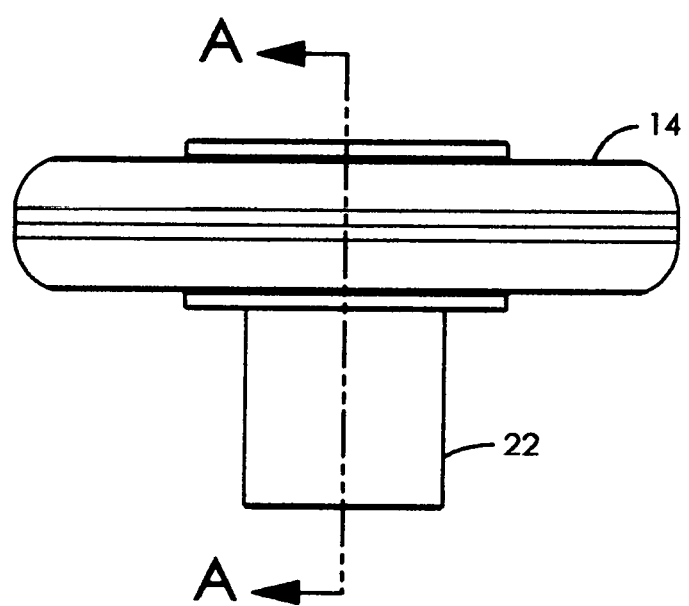
FIG. 2 is a side view of an exemplary as motor structure.
Figure 4:
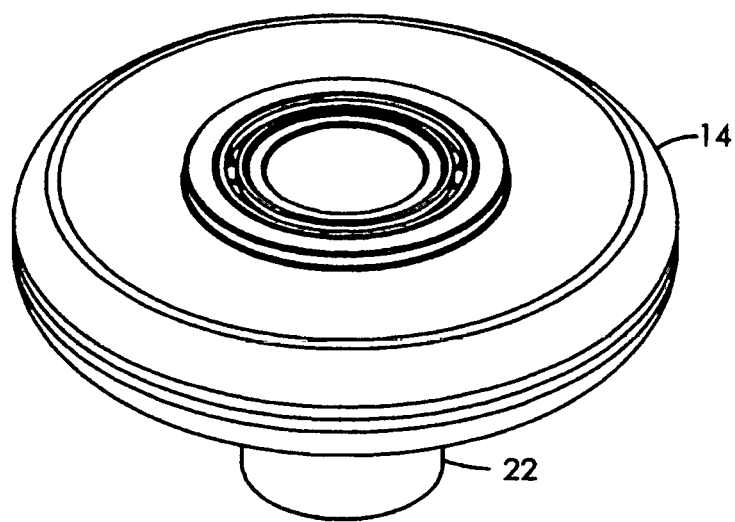
FIG. 4 is a perspective view of the exemplary embodiment of the motor structure illustrated in FIG. 2.

Referring to FIGS. 2, 3 and 4, the motor 14 is a hollow shaft motor having a hollow shaft 22 as illustrated in an exemplary embodiment shown in the Figures. FIG. 3 is a section along lines A-A of FIG. 2. The motor 14 has a rotation axis 29 which is coaxial with the central axis of the hollow shaft 22.

Figure 6:
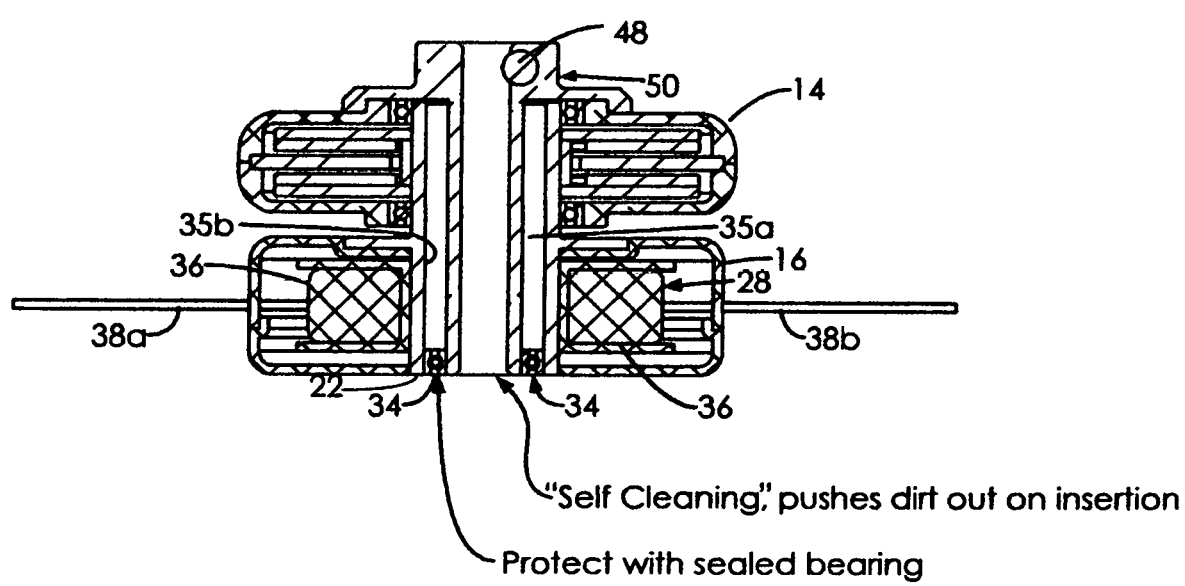
FIG. 6 is a cross-sectional view of the motor and string cutter housing of FIG. 5.
Figure 5:
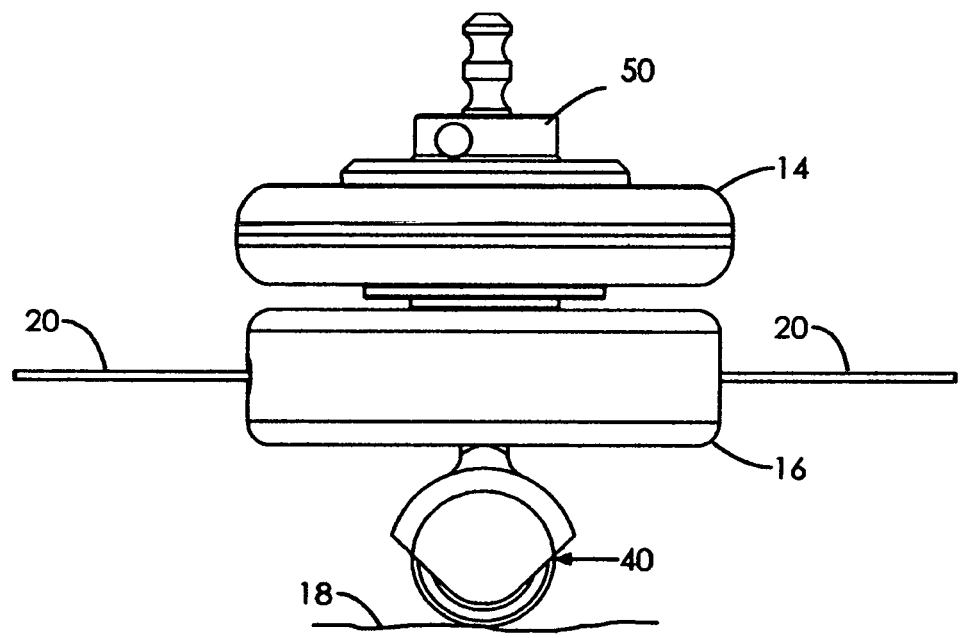
FIG. 5 is a side view illustrating an exemplary embodiment of the motor, string cutter housing, and support mechanism.
Figure 11:
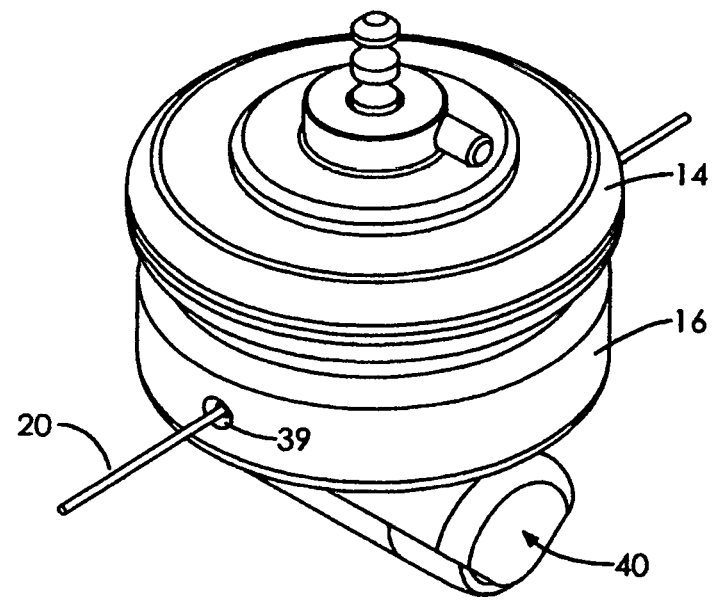
FIG. 11 is a perspective view of the motor, string cutter housing, and support mechanism of FIG. 5.

In accordance with an exemplary embodiment of the invention, referring to FIGS. 5, 6, and 11 the cutting mechanism 16 attaches to the motor through the hollow shaft 22. The connection structure allows the hollow shaft 22 to pass through the center region of the cutting mechanism. The string cutting mechanism 16 includes within its housing a rotating string structure 28 able to be driven in rotation coaxially with the motor axis 29 (FIG. 3) by a connection to the motor. The rotation axis of the cutting mechanism is thus coaxial with the axis 29 of the hollow shaft. The connection between the hollow shaft and the rotating portions of the cutter mechanism are made through a bearing structure 34 as is well known in the art. While many different embodiments of the cutting device are available, as is well known in the field, in essence the cutting device has a string element roll 36 within its confines which it can automatically and through a mechanical motion command, enable its filaments or "string" 38a and 38b, to be extended outward from the body of the cutting device through openings 39 in response to being rotated by the motor.

Figure 7:
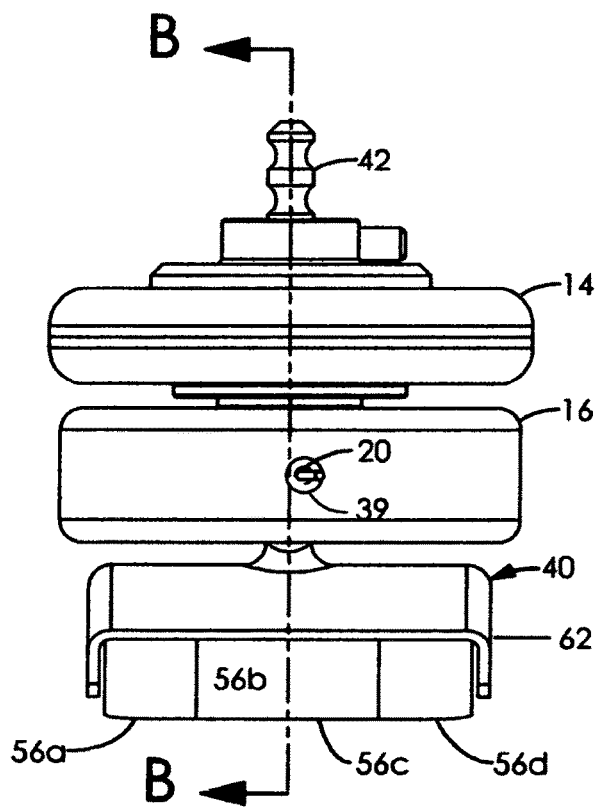
FIG. 7 is a view of the motor, string cutter housing, and support mechanism of FIG. 5 rotated 90° around the motor axis from that of FIG. 5.
Figure 8:
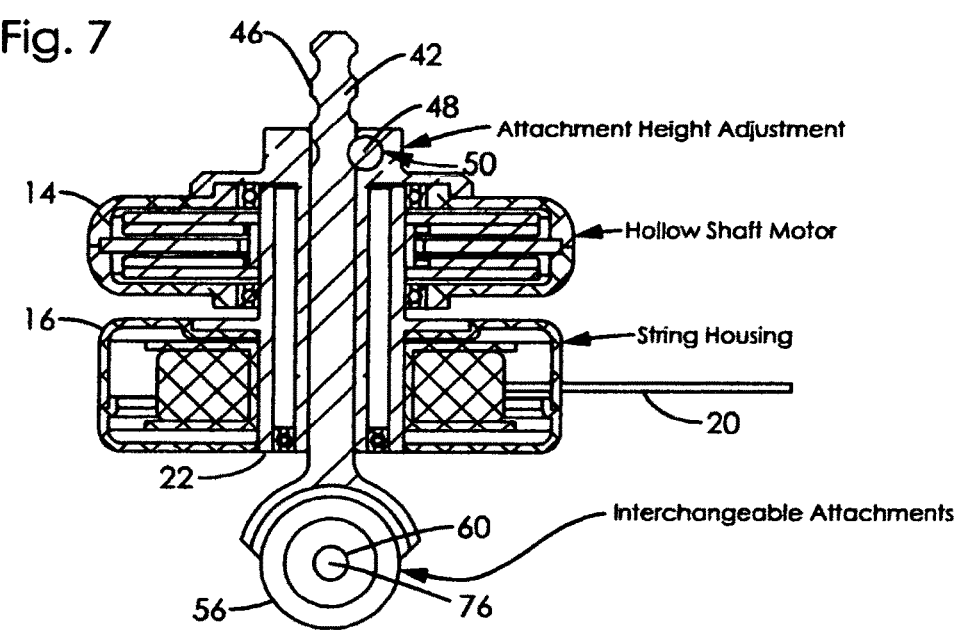
FIG. 8 is a cross-sectional view, taken along section lines B-B of FIG. 7.

Referring to FIGS. 5, 7 and 8, the combination of the drive motor 14 and the cutting device 16 are supported by a rotational support mechanism 40. The exemplary rotational support mechanism 40, illustrated in FIGS. 7 and 8, has a shaft 42 which extends into and at least partially through the hollow shaft 22 of the motor 14. The shaft 42 is held in a vertical position relative to the motor by an attachment mechanism. In an exemplary embodiment of the invention, the attachment mechanism includes grooves 46, much like a screw, and the shaft is pinned to a selected vertical location by a ball 48 disposed with one of the grooves 46, the ball 50 being spring loaded in the ball holding structure 50 which is rigidly attached to a top surface of motor 14. In this manner, the vertical position of shaft 42 can be adjustably set to control the location of the rotating support member 40 relative to the bottom of the cutting mechanism 16. The shaft 42 also, upon insertion, acts to clean dirt and other debris from the interior of the hollow shaft 22. In addition, bearings 34 are preferably sealed bearings to protect the space between the outer surface 35a of the hollow shaft and the inner surface 35b of the rotational string cutting mechanism.

In various exemplary embodiments of the invention, the rotating support mechanism 40 can have one of several exemplary structures. As illustrated in FIGS. 7 and 8, one exemplary structure has, for the rotational support, a multi-element roller, illustrated here as having 4 coaxial rollers 56a, 56b, 56c, and 56d, all rotatably positioned on and connected to an axle 60. The coaxial rollers also rotate, as a unit, about the central axis of the shaft 42 in a horizontal plane. The rollers 56 a,b,c,d are free to rotate independently from each other, in the exemplary embodiment, about the horizontal axle 60. The axle 60 is held by a U-shaped support mechanism 62 which connects to the shaft 42. Accordingly, as shaft 42 moves vertically relative to the motor 14, the distance of the plane of the rotating filaments (or "strings") 20 to a surface 18 varies. In the exemplary embodiments herein, the support mechanism thus has two axes of rotation, one about a first axis which is coaxial with the axis of motor 14, that is, axis 29, and one about a second axis, which rotates in a plane parallel to the plane of the rotating "filaments," and is defined by the axis of the axle 60. Thus the second axis of rotation is the axis of the horizontal axle 60 of the support mechanism 40.

Figure 12:
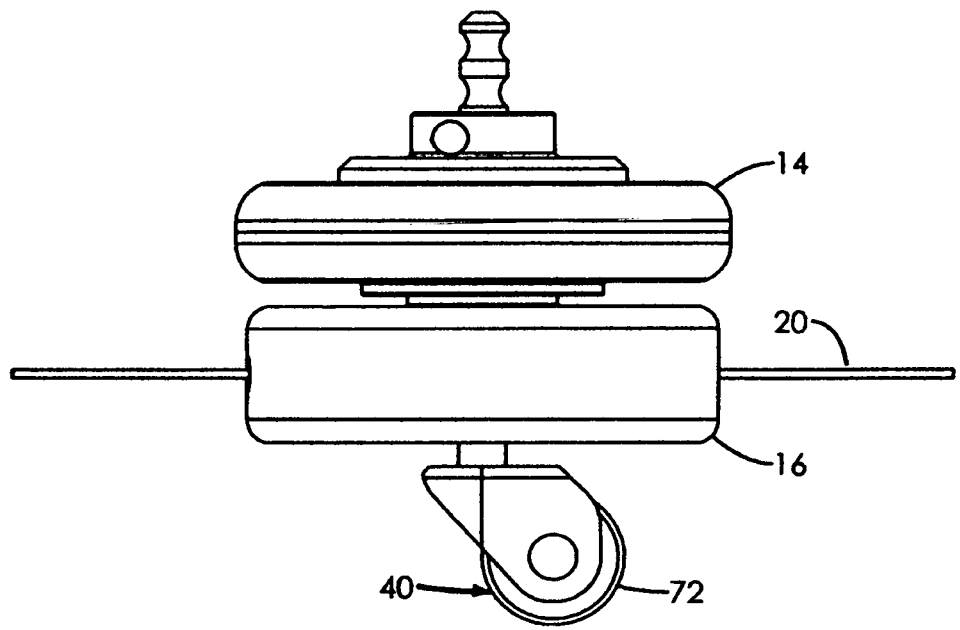
FIGS. 12 and 13 are exemplary side views rotated 90° from each other of an alternate embodiment of the invention using a single support wheel.
Figure 13:
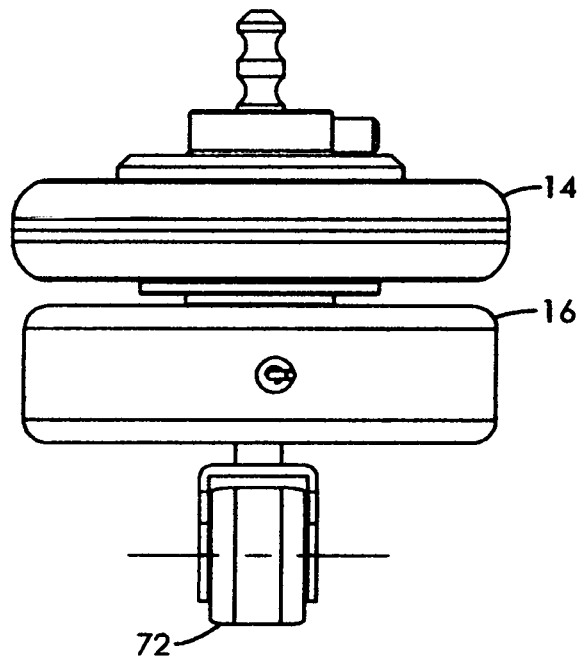
Figure 14:
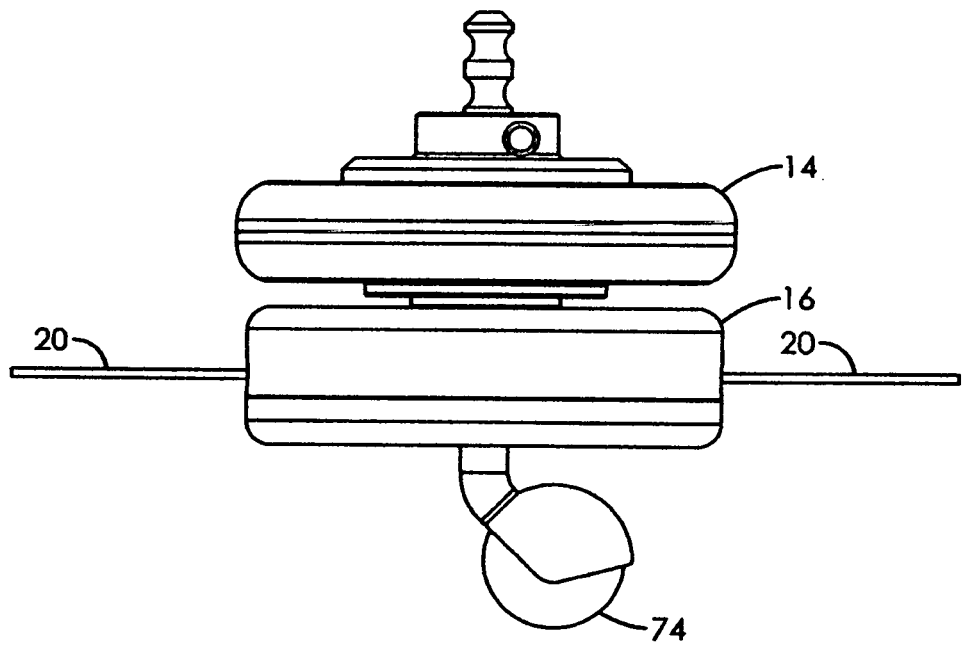
FIGS. 14 and 15 are exemplary side views rotated 90° from each other of a further alternate exemplary embodiment of the invention using a spherical support element.
Figure 15:
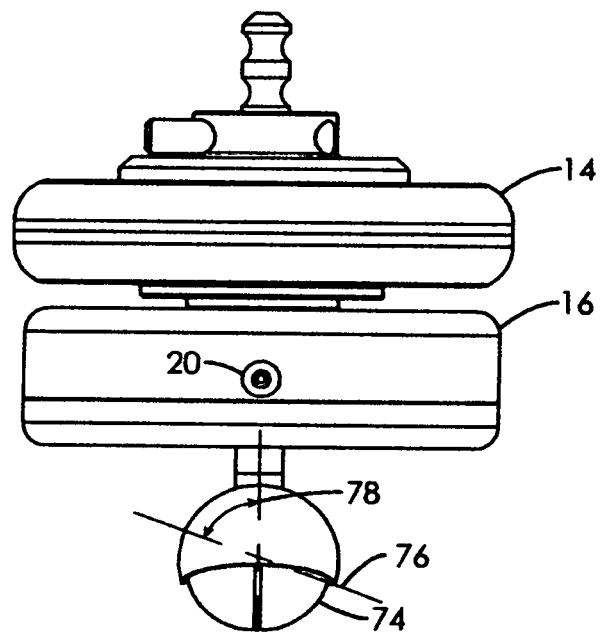

In other exemplary embodiments of the string cutter, different support elements can be used. For example, referring to FIGS. 12 and 13, the support element rotating rollers 56 can be replaced by a single roller (or wheel) 70, as illustrated In FIGS. 12 and 13. Alternatively, for example, referring to FIGS. 14 and 15 the wheels or rollers 56 can be replaced by a single spherical rotational element 74 connected to a shaft comparable to shaft 42 where the element 74 has a rolling axis of rotation 76 at an angle 78, which is typically other than a right angle to the axis of shaft 42 (as opposed to the right angle 76 as illustrated in FIG. 8.

Figure 9:
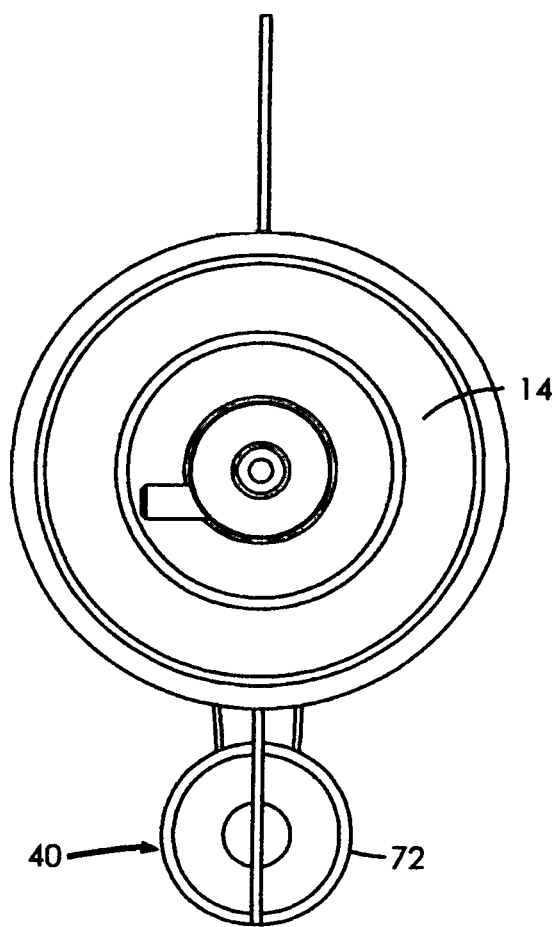
FIG. 9 is a side view of the string cutter of FIG. 5 configured for edging.
Figure 10:
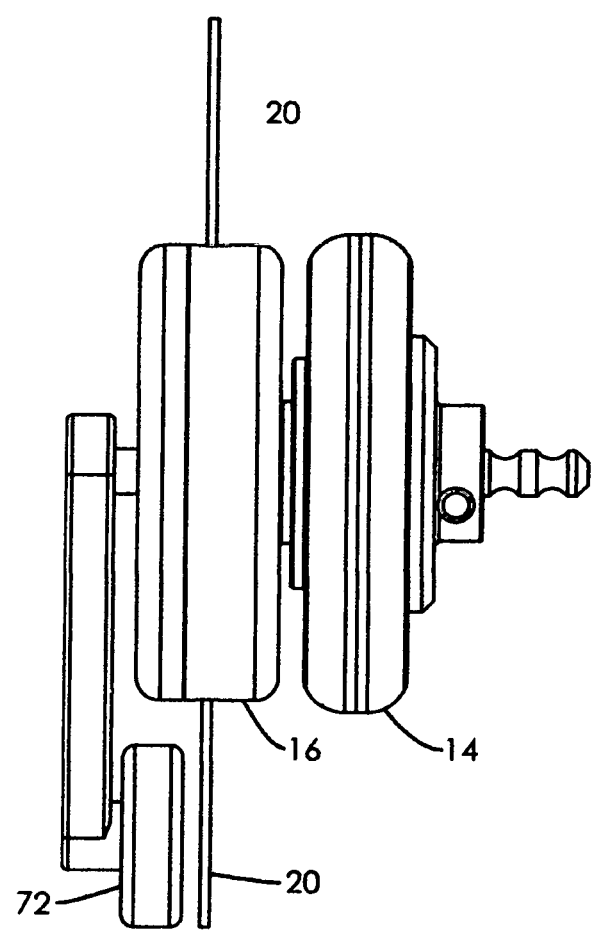
FIG. 10 is a side view of the edging configuration of FIG. 9 where the view is rotated 90° around a vertical axis from FIG. 9.

Referring to FIGS. 9 and 10, the string cutter configuration is modified, as is known in the field, to effect an edging function. In this configuration, the string cutter is still supported by a single element, in this case a wheel 70, but the orientation of the wheel 70 has been modified by providing the motor axis to be horizontal as opposed to substantially vertical. The corresponding connections are modified also to implement this mechanical arrangement.

In yet further exemplary embodiments of the invention, the shaft 42, acting as a support and adjustable in its axial direction, can be replaced by any of many structures well known to have variable or fixed connections so that the height of the cutting device above the surface on which it rests can be predetermined and fixed, or variable as needed in operation. Importantly, this structure allows the cutting device 10 to rest on the surface 18 on which it is moving in order to relieve the constant weight of the mechanism on the user through the handles 14 with the resulting physical fatigue which results. In addition, the use of a single shaft pivoting support able to provide rotation about the motor axis by the support mechanism enables the distance of the plane in which the filaments rotate to the support surface to remain constant even as the surface is uneven. Thus because there is a single support element, and the cutter is substantially immediately responsive to the up and down unevenness of the supporting surface and maintains the set height from the surface over which it is moving. This enables the device to be sensitive only to the ground or surface intersected by the axis of the support mechanism and not to be affected by changes in surface height at distances away from the axis of the support mechanism.

Other objects and features of the invention will be apparent to those practiced in the field and are within the scope of the following claims.

What is claimed is:

1. A string cutter device comprising:
   a string cutting mechanism, and
   a motor having a motor rotation axis and including an internal elongated hollow shaft rotatably connecting the motor to the string cutting mechanism, the string cutting mechanism axially aligned with the motor rotation axis for rotating the string cutting mechanism at a cutting rotational speed;
   the internal elongated hollow shaft having a hollow shaft axis coaxial with the motor rotation axis, the internal elongated hollow shaft extending from a distal end of the string cutting mechanism toward and into an operable part of the motor and connected the operable part of the motor, the internal elongated hollow shaft having an opening at least at one end thereof; and
   a rotational support mechanism having a mounting shaft rotatably connecting a rolling mechanism to the motor, the mounting shaft extending within the internal elongated hollow shaft and having a mounting shaft axis aligned with the hollow shaft axis, the rotational support mechanism mounting shaft being connected in an axially-fixed position along the internal elongated hollow shaft to support the cutting mechanism at a selected distance, measured along the mounting shaft axis, from a ground surface on which the rolling mechanism rolls.

2. A string cutter comprising:
   an elongated shaft having a shaft axis and having a distal end and a proximal end;
   a handle mechanism connected to the elongated shaft at the proximal end;
   a motor connected to the elongated shaft at the distal end, the motor including a motor rotation axis and an internal hollow shaft, the internal hollow shaft rotationally connecting the motor to a string cutting mechanism, the string cutting mechanism axially aligned with the motor rotation axis for rotating the string cutting mechanism at a cutting rotational speed;
   the internal hollow shaft extending from a distal end of the string cutting mechanism toward and connected to an operable part of the motor, the internal hollow shaft defining a hollow shaft axis coaxial with the motor rotation axis and having an opening at least at one end thereof; and
   a rotational support mechanism having a mounting shaft rotatably connecting a rolling mechanism to the motor, the mounting shaft extending within the internal hollow shaft and aligned with the hollow shaft axis, the rotational support mechanism mounting shaft being connected to the internal hollow shaft in an operationally axially-fixed position along the internal hollow shaft to support the cutting mechanism at a selected distance, measured along the mounting shaft axis, from a ground surface on which the rolling mechanism rolls.

3. The string cutter of claim 2, further comprising:
   a vertical attachment mechanism for releaseably fixing the mounting shaft at selectively different axial positions relative to the hollow shaft axis, the rotational support mechanism thereby able to vary said selected distance, measured along the hollow shaft axis, from said ground surface on which the rolling mechanism rolls.

4. The string cutter of claim 2, wherein the internal hollow shaft is rigid and straight.

5. The string cutter of claim 2, wherein
   the rolling mechanism is mounted on the mounting shaft such that it is rotatable with the mounting shaft about the mounting shaft axis, and the rolling mechanism having at least one rolling support element, the at least one rolling support element having a rotational axis which is not parallel to the mounting shaft axis, the at least one rolling support element being rotatable about said rotational axis.

6. The string cutter of claim 5, wherein the at least one rolling support element is a spherical wheel.

7. The string cutter of claim 5, wherein
   the at least one rolling support element comprises a roller having the rotational axis normal to the mounting shaft axis.

8. The string cutter of claim 2, wherein
   the string cutting mechanism has a plane of rotation which is normal to the hollow shaft axis.

* * * * *